Patented Jan. 31, 1939

2,145,443

UNITED STATES PATENT OFFICE 2,145,443

HALOGEN-CARBOXYLIC ACID ESTERS

Benjamin R. Harris, Chicago, Ill.

No Drawing. Original application January 21, 1937, Serial No. 121,563. Divided and this application April 24, 1937, Serial No. 138,839

11 Claims. (Cl. 260—487)

My invention relates to a new class of chemical substances, and more in particular to a new class of chemical substances, particularly adapted for use as intermediates for the preparation of detergents, penetrating, lathering, flotation and anti-spattering agents, and for frothing purposes.

In certain classes of industries, there is a need for a certain class of chemical substances usually used in relatively small quantities but capable of use in larger quantities to secure an effect principally the result of a wetting action such as at a water-oil interface. In the textile and dyeing industries, for example there are many situations where a wetting or detergent action is imperative and many different chemical substances have been produced calculated to reduce surface tension and promote wetting in these industries. The use of prior art substances has not been attended with unqualified success in all instances. In certain other types of industries, such as the margarine industries, for example, problems in preventing the spattering of margarine in frying have arisen. These problems are considered by some investigators as entirely a matter of wetting; in other words, by promoting greater attraction between the oleaginous and aqueous portions of the emulsion at the interfaces thereof. Although the problem is probably not one of wetting action entirely, it appears that certain compounds which in theory tend to concentrate at the water-oil interface have an effect upon the spattering behavior of margarine. This problem is discussed and a remedy disclosed in my Patent No. 1,917,256, filed as a continuation-in-part of a prior application, Serial No. 475,622, now Patent No. 1,917,250.

The principal object of my invention is the provision of a new class of chemical substances which are in general of relatively simple structure and can be cheaply made in commercial quantities.

Still another object of my invention is the provision of a class of intermediate chemical compounds from which the chemical substances discussed above may be produced.

Other objects and features of the invention will be apparent from a consideration of the following detailed description.

The substances of my invention are in general ester derivatives of lower molecular weight halogen-containing mono-carboxylic or fatty acids wherein the group esterified with the said halogen-containing acid has a lipophile radical with at least four carbon atoms. In certain circumstances the compounds may contain more than one halogen-containing mono-carboxylic or fatty acid group, but in all cases there must be at least one such group. The halogen-containing mono-carboxylic or fatty acid radical is of relatively low molecular weight and should contain not more than eight carbons.

Considering the compounds from another aspect, the molecule in each may contain at least one relatively high molecular weight lipophile group and at least one relatively low molecular weight halogen-containing group which, in the class of compounds to which my present invention relates, are mono-carboxylic acid radicals. A more complete understanding of what may comprise the lipophile group and the particular character of the halogen-containing mono-carboxylic acid group will be had as the detailed description progresses.

More specifically, the substances of my invention are lower molecular weight halogen-containing mono-carboxylic or fatty acid esters of polyhydroxy substances, at least one hydroxy group of the polyhydroxy substance being esterified with a carboxylic acid containing at least four carbon atoms and preferably between eight and eighteen carbon atoms. Examples of compounds falling within the scope of my invention are as follows:

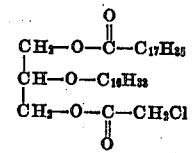

Cetyl ether of monostearin chloracetate

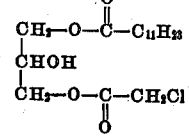

Monolaurin chloracetate

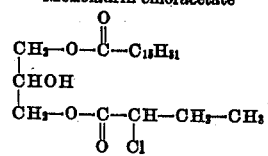

Monopalmitin chlorbutyrate

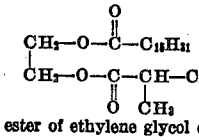

Monopalmitic ester of ethylene glycol chlorpropionate

Di-chloracetic acid ester of mono-olein

$$CH_2-O-\overset{O}{\overset{\|}{C}}-C_{17}H_{33}$$
$$CH-O-\overset{O}{\overset{\|}{C}}-CH_2Cl$$
$$CH_2-O-\overset{O}{\overset{\|}{C}}-CH_2Cl$$

Mono-palmitic acid ester of tri-methylene glycol chloracetate

$$CH_2-O-\overset{O}{\overset{\|}{C}}-C_{15}H_{31}$$
$$CH_2$$
$$CH_2-O-\overset{O}{\overset{\|}{C}}-CH_2Cl$$

α—stearic, β—benzoic, α'—chloracetic acid ester of glycerin

$$CH_2-O-\overset{O}{\overset{\|}{C}}-C_{17}H_{35}$$
$$CH-O-\overset{O}{\overset{\|}{C}}-C_6H_5$$
$$CH_2-O-\overset{O}{\overset{\|}{C}}-CH_2Cl$$

α—stearic, β—(p-sulphethoxy) benzoic, α'—chlorpionic acid ester of glycerin

$$CH_2-O-\overset{O}{\overset{\|}{C}}-C_{17}H_{35}$$
$$CH-O-\overset{O}{\overset{\|}{C}}-C_6H_4-S(=O)_2-OC_2H_5$$
$$CH_2-O-\overset{O}{\overset{\|}{C}}-\underset{Cl}{CH}-CH_3$$

$$C_{17}H_{35}-\overset{O}{\overset{\|}{C}}-O-CH_2-CH_2-O-\overset{O}{\overset{\|}{C}}-C_6H_3Cl_2$$

Monostearic acid ester of diethylene glycol chloracetate

$$CH_2-O-\overset{O}{\overset{\|}{C}}-C_{17}H_{35}$$
$$CH_2-O-CH_2-CH_2-O-\overset{O}{\overset{\|}{C}}-CH_2Cl$$

Mono-oleic acid ester of diethylene glycol chloracetate

$$CH_2-O-\overset{O}{\overset{\|}{C}}-C_{17}H_{33}$$
$$CH_2-O-CH_2-CH_2-O-\overset{O}{\overset{\|}{C}}-CH_2Cl$$

Generally speaking, I may select many different types of compounds as lipophile groups which are to be sterified with the polyhydroxy substances, principally compounds having lipophile radicals of relatively high molecular weight. For example, the following materials may be utilized as sources of lipophile groups: hydroaromatic acids such as naphthenic acid, abietic acid, hydroxy aromatic acids such as hydroxy benzoic acid, fatty acids such as butyric acid, caprylic acid, caproic acid, capric acid, saturated and unsaturated higher aliphatic acids such as the higher fatty acids containing at least eight carbon atoms and including melissic acid, stearic acid, oleic acid, ricinoleic acid, linoleic acid, lauric acid, myristic acid, palmitic acid, mixed higher fatty acids, derived from animal or vegetable sources, for example, lard, coconut oil, sesame oil, corn oil, cottonseed oil, sardine oil, partially or completely hydrogenated animal and vegetable oils such as those mentioned, fatty acids derived from various waxes such as beeswax, spermaceti, and carnauba wax and carboxylic acids derived, by oxidation and other methods, from petroleum.

The polyhydroxy substances which provide the linkage between the lipophile group and the sulpho-carboxylic group may be selected from a large class and include glycerol; glycol such as ethylene glycol, propylene glycol, trimethylene glycol, butylene glycol and the like; polyglycols such as diethylene glycol; polyglycerols such as diglycerol, triglycerol, tetraglycerol and the like including mixtures thereof; sugars such as dextrose, sucrose, xylose, galactose, fructose, maltose, mannose and the like; sugar alcohols such as arabitol, mannitol, sorbitol and dulcitol; and polyhydroxy-carboxylic acids such as tartaric acid, mucic acid, saccharic acid, gluconic acid, glucuronic acid, gulonic acid, mannonic acid, trihydroxyglutaric acid, glyceric acid, carboxylic oxidation products of polyglycerols, others of similar character, and hydroxyethyl and hydroxypropyl ether derivatives of the above, as for example:

$$H_2C-O-CH_2-CH_2OH$$
$$HC-O-CH_2-CH_2OH$$
$$H_2C-O-CH_2-CH_2OH$$

$$H_2C-O-CH_2-CH_2OH$$
$$HC-O-CH_2-CH_2OH$$
$$H_2C-O-$$
$$H_2C$$
$$H-C-O-CH_2-CH_2OH$$
$$H_2C-O-CH_2-CH_2OH$$

$$H_2C-O-CH_2-CH_2OH$$
$$H-C-O-CH_2-CH_2OH$$
$$H-C-O-CH_2-CH_2OH$$
$$H-C-O-CH_2-CH_2OH$$
$$H-C-O-CH_2-CH_2OH$$
$$H_2C-O-CH_2-CH_2OH$$

(For convenience all hydroxyl groups are written facing one way.)

The compounds of my invention are produced by reacting one or more free or esterifiable hydroxy groups of a polyhydroxy substance or derivative of a polyhydroxy substance with a halogeno-carboxylic acid such as chloracetic or bromacetic acid, or with a halogeno-carboxylic acid halide such as chlor-acetyl chloride or bromacetyl bromide, to form a chloracetate or bromacetate.

The following examples are illustrative of the preparation of compounds falling within the scope of my invention. It will be understood that said examples are given only by way of illustration and are not to be considered in any way limitative of the true scope of my invention.

Example I

Monostearine chloracetate 700 parts of monostearine were heated with 175 parts of chloracetic acid for 3 hours at a temperature of 150–160 degrees C. in an atmosphere of $CO_2$ and with agitation. The reaction product was washed free of chloracetic acid with 4 times its own volume of water at 95 degrees C. and, to assist in separation, 100 parts of salt were added to the wash water.

Example II

Monostearine chloracetate 100 parts of monostearine were heated with 60 parts of chloracetic acid at 160 degrees C. for several hours, using a stream of $CO_2$ for the purpose of agitation and to remove water coming off in the reaction. The heating was continued until the chlorine content corresponded approximately at 100% monostearine chloracetate. When the reaction was completed, the product was washed free of chloracetic acid and dried.

EXAMPLE III

Distearine chloracetate 200 parts of distearine were heated with 65 parts of chloracetic acid for 3 hours at 160–170 degrees C. When the reaction was completed the product was washed free of chloracetic acid and dried.

EXAMPLE IV

Monostearine dichloracetate 500 parts of monostearine were heated with 500 parts of chloracetic acid at a temperature of 160 degrees C. for several hours using a stream of $CO_2$ for the purpose of agitation and to remove water of reaction. The heating was continued until the chlorine content corresponded to approximately 100% of monostearine dichloracetate.

EXAMPLE V

Monostearic acid ester of diethylene glycol chloracetate 500 parts of diethylene glycol monostearate, prepared by heating a mixture of one part of stearic acid with one part of diethylene glycol at a temperature of about 220 degrees C., using 0.1% KOH until the free fatty acid content is down to about ½ to 1%, were heated with 250 parts of chloracetic acid at 160–170 degrees C. for 4 hours. The product was washed free of chloracetic acid and dried.

EXAMPLE VI

Cottonseed oil fatty acid esters of diethylene glycol chloracetate 500 parts of cottonseed oil fatty acid mono esters of diethylene glycol, prepared by reesterifying cottonseed oil with diethylene glycol, were heated with 250 parts of chloracetic acid for 3 hours at 160–170 degrees C. in an atmosphere of $CO_2$.

EXAMPLE VII

Coconut mono fatty acid esters of diethylene glycol chloracetate 400 parts of the fatty acid mono esters of diethylene glycol with mixed coconut oil fatty acids were heated with 260 parts of chloracetic acid for 3 hours at 160 degrees C. using a stream of $CO_2$ for agitation and removal of moisture.

EXAMPLE VIII

Monococonut oil fatty acid ester of glycerine chloracetate

Coconut oil mono-fatty acid ester of glycerine was prepared by reesterifying coconut oil with excess of glycerine and removing the excess of glycerine. 300 parts of said ester were heated with 200 parts of chloracetic acid at 160 degrees C. for several hours in an atmosphere of $CO_2$ until the theoretical chlorine content corresponding to the monochloracetate was obtained.

The compounds of my invention may be represented by the following general formula

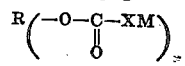

wherein R is the residue of a polyhydroxy substance in which the hydrogen of at least one hydroxyl group is substituted by an acyl group containing at least four carbon atoms and preferably between eight and eighteen carbon atoms, X is the carbon-hydrogen residue of the halogeno-carboxylic acid, M is halogen, and $w$ is a small whole number, at least one.

It is apparent, in the light of the above examples, that the lipophile group may in itself contain hydrophile radicals. For example, in the case of monostearin chloracetate, the hydroxy radical of the second glycerine carbon has a recognized hydrophillic character. The group as a whole, however, of which this hydroxy radical is a part, is dominantly lipophile, the single hydroxy radical in such a compound being insufficient to impart dominant hydrophile characteristics to the group as a whole. When the character "R" is used in the formula, therefore, to represent a lipophile group, it is with the assumption that the group as a whole does not possess a hydrophillic character.

Considering more specifically the character of the lipophile group, it will at once be apparent that for the most part I employ esters of glycerol, glycols or other polyhydric alcohols or polyhydroxy substances attached to the halogen-containing mono-carboxylic or fatty acid of relatively low molecular weight through an ester linkage. In so far as the halogen-containing mono-carboxylic or fatty acid group is concerned, I may employ a chlor-acetate, chlor-butyrate, or other similar groups containing, generally, not more than eight carbon atoms. In general, however, I have found that the chlor- or brom-acetates particularly produce compounds of exceptionally desirable characteristics and they have the advantage of being relatively inexpensively produced from commercially available substances.

The term "residue", as used throughout the specification and claims, is employed in its ordinarily understood chemical significance. For example, where one of the hydroxyl groups of glycerine is esterified with a fatty acid and another of the hydroxyl groups of the glycerine is esterified with a halogen-containing mono-carboxylic acid, that which remains of the glycerine molecule, for example

is the "residue" of the polyhydroxy substance, in this case glycerine.

Similarly, the term "carbon-hydrogen residue" of a halogen-containing mono-carboxylic acid is employed as in conventional chemical nomenclature. Thus, for example, chloracetic acid ($HOOC-CH_2-Cl$) is esterified with glycerine, the group $-CH_2-$ is to be considered as the "carbon-hydrogen residue" of the chlor-acetic acid.

Unless otherwise indicated, the term "higher", wherever employed in the claims, will be understood to mean at least eight carbon atoms and, concomitantly, the term "lower" will mean less than eight carbon atoms.

My present application is a division of my co-pending application, Serial No. 121,563, filed January 21, 1937, and is directed to the intermediate compounds from which the sulpho-carboxylic acid esters therein disclosed may be prepared. It is obvious, of course, that said intermediates may be employed in the preparation of other types of compounds and may possess utility as such in various arts and industries.

What I claim as new and desire to protect by Letters Patent of the United States is:

1. Esters of polyhydroxy substances wherein at least one hydroxy group of said polyhydroxy substances is esterified with a fatty acid containing at least eight carbon atoms and at least one hydroxy group of said polyhydroxy substances is esterified with a halogen-containing monocarboxylic acid having less than eight carbon atoms.

2. Esters of fatty acid monoglycerides, the fatty acid radical of which contains at least eight carbon atoms, at least one hydroxy group of said monoglycerides being esterified with a halogen-containing monocarboxylic acid having less than eight carbon atoms.

3. A halogen-containing aliphatic mono-carboxylic acid ester of a member of the group consisting of fatty acid monoglycerides, fatty acid diglycerides, and mixtures thereof, the radical of said halogen-containing aliphatic mono-carboxylic acid having less than eight carbon atoms, and the radicals of said fatty acids containing at least eight carbon atoms.

4. Chloracetates of a member of the group consisting of fatty acid monoglycerides, fatty acid diglycerides, and mixtures thereof, the radicals of said fatty acids containing at least eight carbon atoms.

5. Bromacetates of a member of the group consisting of fatty acid monoglycerides, fatty acid diglycerides, and mixtures thereof, the radicals of said fatty acids containing at least eight carbon atoms.

6. A halogen-containing aliphatic monocarboxylic acid ester of monostearin, the radical of said halogen-containing aliphatic mono-carboxylic acid having less than eight carbon atoms.

7. Chemical compounds of the class consisting of monostearin chloracetate and monostearin bromoacetate.

8. A chemical compound corresponding to the formula

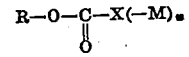

wherein R is the residue of a polyhydroxy substance in which the hydrogen of at least one hydroxyl group is substituted by an acyl group containing at least four carbon atoms, M is halogen, X is the carbon-hydrogen residue of a halogeno-carboxylic acid containing less than eight carbon atoms, and $w$ is a small whole number, at least one.

9. The compound of claim 8 wherein the polyhydroxy substance is a member of the group consisting of glycols, glycerol, polyglycols, polyglycerols, sugars, and sugar alcohols.

10. A chemical compound corresponding to the general formula

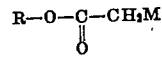

wherein R is the residue of a polyhydroxy substance in which the hydrogen of at least one hydroxyl group is substituted by an acyl group containing at least four carbon atoms, and M is halogen.

11. A chemical compound corresponding to the formula

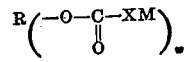

wherein R is the residue of a polyhydroxy substance in which the hydrogen of at least one hydroxyl group is substituted by an acyl group containing at least four carbon atoms, X is the carbon-hydrogen residue of a halogeno-carboxylic acid containing less than eight carbon atoms, M is halogen, and $w$ is a small whole number, at least one.

BENJAMIN R. HARRIS.